(12) United States Patent
Stern et al.

(10) Patent No.: US 6,267,233 B1
(45) Date of Patent: Jul. 31, 2001

(54) ADMISSION TICKET RECEPTACLE BEARING INFORMATION AND PROMOTIONAL MATERIAL

(76) Inventors: Jon L. Stern, 6 Underhill Rd., Mill Valley, CA (US) 94941; Keith Hippely, 5114 Harkness St., Manhattan Beach, CA (US) 90266

( * ) Notice: Subject to any disclaimer, the term of this patent is extended or adjusted under 35 U.S.C. 154(b) by 0 days.

(21) Appl. No.: 09/418,244

(22) Filed: Oct. 14, 1999

Related U.S. Application Data

(63) Continuation-in-part of application No. 29/101,626, filed on Mar. 8, 1999.

(51) Int. Cl.$^7$ ................................................. B65D 85/57
(52) U.S. Cl. ......................... 206/308.1; 206/39; 206/457; 283/117
(58) Field of Search ...................... 206/39, 39.7, 232, 206/308.1, 457; 40/124.06, 124.07, 124.08, 124.09, 124.11, 124.12, 124.13, 124.01; 229/67.1, 67.4, 92.8; D19/1, 6–8; 283/117; 446/147

(56) References Cited

U.S. PATENT DOCUMENTS

| | | | |
|---|---|---|---|
| Re. 33,503 | * 12/1990 | Schluger | 206/232 |
| 1,473,800 | * 11/1923 | Webb | D19/7 |
| 1,841,041 | * 1/1932 | Lowenstein | 446/147 |
| 2,148,279 | * 2/1939 | Sandberg | 229/92.8 |
| 2,580,241 | * 12/1951 | Podomore | D19/8 |
| 3,655,119 | * 4/1972 | Thompson | 206/39 |
| 4,428,526 | * 1/1984 | Riley | 229/92.8 |
| 4,433,780 | * 2/1984 | Ellis | 206/232 |
| 5,110,155 | * 5/1992 | Piechocki et al. | 283/117 |
| 5,232,087 | * 8/1993 | Schluger | 206/232 |
| 5,317,823 | * 6/1994 | Brunt, II | 40/124.08 |
| 5,487,566 | * 1/1996 | Hedge, Jr. | 40/124.13 |
| 5,542,709 | * 8/1996 | Evans | 283/117 |
| 5,645,214 | * 7/1997 | Taganas | 229/92.8 |
| 5,743,035 | * 4/1998 | Bradley et al. | 283/117 |
| 5,813,596 | * 9/1998 | Dahlquist | 229/92.8 |
| 5,933,989 | * 8/1999 | Volkert et al. | 40/128.08 |
| 5,945,369 | * 9/1999 | Seabrook | 283/117 |
| 5,947,281 | * 9/1999 | Kaneff | 206/308.1 |

* cited by examiner

Primary Examiner—Jim Foster
(74) Attorney, Agent, or Firm—Roy A. Ekstrand (57) ABSTRACT

A receptacle for use in receiving and supporting an admission ticket or admission stub is formed of a planar sheet of heavy paper or cardboard or similar material cut to define a plurality of panels joined along fold lines. The ticket receptacle is foldable along the fold lines to place the panels in overlying relationship and to define a corner pocket configured to receive an admission ticket or ticket stub. The various surfaces of the panels support pluralities of images elements which are suitable for communicating the desired information to the ticket recipient.

13 Claims, 10 Drawing Sheets

ADMISSION TICKET RECEPTACLE BEARING INFORMATION AND PROMOTIONAL MATERIAL

CROSS REFERENCE TO RELATED PATENT APPLICATION

This application is a continuation in part of a co-pending patent application Ser. No. 29/101,626 filed Mar. 8, 1999 which is pending, on behalf of the Applicant of the present application and entitled JACKET FOR ADMISSION TICKET.

FIELD OF THE INVENTION

This invention relates generally to admission procedures for theatrical, sports and other entertainment environments and particularly to the admission ticket handling and processes used therein. The invention further relates to the distribution of information and promotional materials in such environments.

BACKGROUND OF THE INVENTION

In most theaters, sports and other entertainment environments, the customers and patrons of the event purchase tickets either from a box office or in advance and thereafter proceed to an entrance door at which point the tickets are presented to gain admission. Often customers and patrons are given instructional or promotional materials at such ticket presentation together with a ticket stub or stamp ticket portion. Thereafter the customers or patrons of the event are admitted to the facility and the ticket stub or stamped ticket is retained to identify a paid customer or patron should such identification be necessary subsequent to admission. In addition, certain entertainment theaters and sports environments utilized assigned seating in which case the retained ticket stub or stamped ticket serves to identify the assigned seat for the customer or patron.

A similar process occurs in other environments such as those utilized in transportation activities such as airports, railroad stations and bus terminals. Thus there are a wide variety of events and activities which employ some sort of admission ticket utilized in gaining access to the facility and at which various promotional or informational material are provided to the customer or patron upon entrance to the facility.

The admission tickets utilized in such varied facilities are subject to a corresponding variation of form size and structure. However, most admission tickets generally comprise relatively small pieces of paper or cardboard baring the necessary information and event identification to confirm ticket purchase and the customer or patrons right to admission. As mentioned above, many facilities in which an admission ticket is utilized to gain access also participate in the common practice of distributing various informational, advertising or promotional materials to the customer or patron. Typically such materials take the form of loose paper sheets which are often variously colored or embossed with various interesting images to provide an attractive and interesting item which encourages the customer or patron to absorb the desired information or promotional advertising messages. While the distribution of such promotional material is opportune for the event organizers, operators of the environments and facilities within in which such events are carried forward often find the distribution of such advertising, promotional and informative materials to be a nuisance or undesired expense due to the tendency of customers or patrons to carelessly discard such materials. In addition, the customer or patron often completely ignores the promotional material and discards unread and unexamined at the first opportunity.

Thus while there exists a need and/or desire on the part of facility operators to communicate promotional, advertising or information material to patrons of the facility, the resulting problems of ineffective communication and additional costs of cleaning up discarded material tends to discourage the distribution of such materials. As a result, important opportunities to communicate advertising, promotional or informational material to consumers is not effectively exploited.

There remains therefore a continuing need in the art for a low cost and effective means for communicating promotional, advertising and informational materials to attendees and customers at ticketed events such as theaters, sports, other entertainment and transportation activities such as airports, bus terminals or railroad stations.

SUMMARY OF THE INVENTION

Accordingly, it is a general object of the present invention to provide an improved means for communicating advertising, promotional and information materials to a customer or attendee at ticketed event. It is a more particular object of the present invention to provide an admission ticket receptacle for use at such ticketed events which effectively communicates the desired advertising, promotional and informational materials to the ticket purchasing attendees.

In accordance with the present invention there is provided a ticket receptacle constructed to receive an admission ticket, the ticket receptacle comprising: a plurality of generally planar panels joined by a plurality of fold lines, each of the panels defining an upper edge; a plurality of images formed on the panels; and closure means extending from one of the panels, the plurality of panels defining a closed configuration by being folded about the fold lines to overlie each other and to form a ticket-retaining pocket for receiving an admission ticket and the closure means being attachable to one of the panels to maintain the panels in the closed configuration.

In accordance with another aspect of the present invention there is provided a ticket receptacle for constructed to receive and support a ticket, the ticket receptacle comprising: a generally planar front panel having first and second opposed surfaces, a first upper edge and a first lower edge; a generally planar rear panel joined to the front panel along a first fold line and having third and fourth opposed surfaces and a second upper edge and a second lower edge; a generally planar interior panel joined to the rear panel along a second fold line and having fifth and sixth opposed surfaces and a third upper edge and a third lower edge; and a generally planar ticket flap joined to the front panel along a third fold line and having seventh and eighth opposed surfaces and a fourth upper edge and a fourth lower edge and having an adhesive area proximate the fourth lower edge, the interior panel, the front panel and the ticket flap being foldable about the second, first and third fold lines respectively between an open configuration generally coplanar with the rear panel and a closed configuration in which the interior panel overlies the rear panel, the front panel overlies the interior panel and the ticket flap wraps about and overlies the rear panel and is releasably attached to the rear panel by the adhesive area.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which;

DESCRIPTION OF THE PREFERRED EMBODIMENTS

Figure 1:
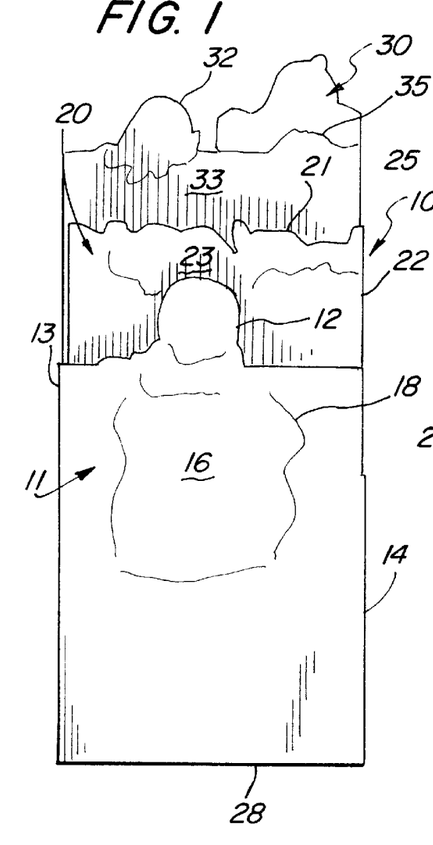
FIG. 1 sets forth a front view of an admission ticket receptacle constructed in accordance with the present invention.

FIG. 1 sets forth a front view of an admission ticket receptacle constructed in accordance with the present invention and generally referenced by numeral 10. Ticket receptacle 10 is fabricated in the manner set forth below and is formed of a plurality of panels joined along fold lines between adjacent panels. Suffice it to note here that FIG. 1 shows admission ticket receptacle 10 in its folded configuration and thus the panels thereof appear in overlying or overlapping configuration.

More specifically, admission ticket receptacle 10 includes an front panel 11 defining an outer surface 16 upon which a plurality of printed images 18 are formed. Images 18 comprise the desired information and/or promotional and/or advertising material desired to be communicated to customers or patrons receiving ticket receptacle 10. Front panel 11 further defines an upper edge 12 preferably shaped in correspondence to images 18. Admission ticket 10 further includes a rear panel 30 defining a surface 33 having a plurality of images 35 formed thereon. Rear panel 30 and front panel 11 are joined along a fold line 13. Admission ticket receptacle 10 further includes a ticket flap 40 (seen in FIG. 2) joined to front panel 11 along a fold line 14. Finally, admission ticket receptacle ticket 10 includes an interior panel 20 having a surface 23 formed thereon which supports a plurality of images 25. Interior panel 20 further defines an upper edge 21 preferably shaped to correspond to images 25. Interior panel 20 is joined to rear panel 30 along a fold line 22.

In accordance with the preferred fabrication of the present invention, front panel 11 is the smallest panel while rear panel 30 is the largest and interior panel 20 defines and intermediate size. In accordance with this fabrication, edge 12 of front panel 11 is visible upon surface 23 of interior panel 20 while edge 21 of panel 20 is visible upon surface 33 of rear panel 30. Further edge 32 which is shaped in accordance with images 35 of rear panel 30 is visible as the upper most edge of admission ticket receptacle 10. Front panel 11 defines a bottom edge 28 which in the embodiment shown in FIG. 1 is a simple straight edge shape. However, it will be apparent to those skilled in the art that edge 28 may be shaped otherwise to provide an additional interesting appearance quality for admission ticket 10. In addition, and as is better seen in FIG. 3, panels 20 and 30 as well ticket flap 40 also define corresponding edges 27, 38 and 42 respectively which complete each panel. Once again, it will understood by those skilled in the art that variations from the simple straight edge utilized on the bottom of the panels of admission ticket receptacle 10 may be utilized without departing from the spirit and scope of the present invention should they be found advantageous or attractive from an aesthetic perspective.

Returning to FIG. 1, the folded configuration of admission ticket receptacle 10 shown in FIG. 1 defines the configuration of the ticket receptacle when initially presented to the customer or patron at the ticketed event. As such the combination of images and upper edges defined on or upon panels 11, 20 and 30 provide an interesting an eye-catching quality which encourages the user to examine the information provided upon the admission ticket receptacle. In its preferred fabrication, and as is described below in FIG. 3 in greater detail, admission ticket receptacle is preferable formed of a single blank of heavy paper or cardboard or the like which is folded along the various fold lines between panels to produce the closed overlapping panel configuration shown in FIGS. 1 and 2.

Figure 2:
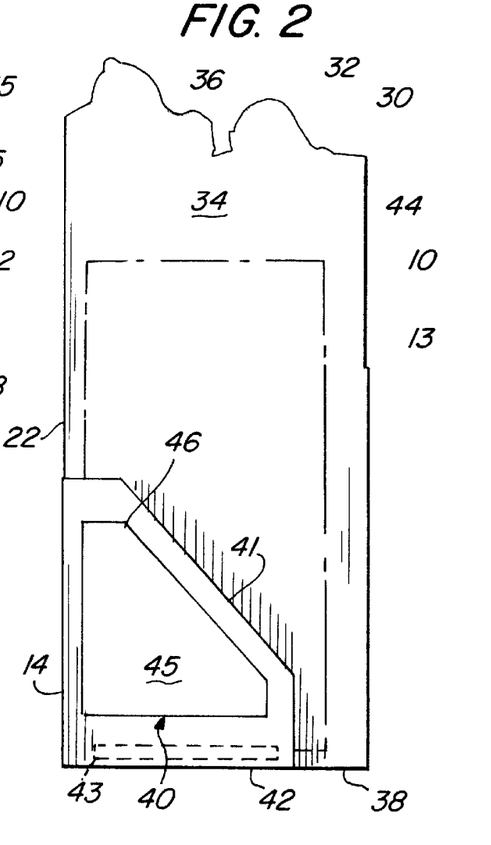
FIG. 2 sets forth a rear view of the present invention admission ticket receptacle.

FIG. 2 sets forth a rear view of admission ticket receptacle 10 in its folded configuration. As described above, ticket receptacle 10 includes a rear panel 30 and a ticket flap 40. As is better seen in FIG. 3, ticket flap 40 is joined to front panel 11 along a fold line 14. Of importance to note in FIG. 2 is the overlap of ticket flap 40 upon rear panel 30 in accordance with the fabrication described below. Rear panel 30 defines a rear surface 34 and an upper edge 32 together with a plurality of images 36. In the preferred fabrication of the present invention images 36 are formed in correspondence to edge 32. As described above, fold line 13 joins rear panel 30 to front panel 11 (seen in FIG. 1).

In accordance with the present invention, ticket flap 40 is folded upon surface 34 of rear panel 30 along fold line 14 such that ticket flap 40 is positioned having edge 42 thereof generally aligned with edge 38 of rear panel 30 and such that ticket flap 40 overlies the lower left hand corner of rear panel 30. The attachment of ticket flap 40 to rear panel 30 is completed by an adhesive area 43 formed upon surface 46 (seen in FIG. 4) of ticket flap 40. The adhesive attachment of ticket flap 40 along edge 42 together with the fold line junction provided by fold line 14 between rear panel 30 and ticket flap 40 produce a closed corner or receptacle between ticket flap 40 and surface 34 of rear panel 30. Ticket flap 40 also defines a surface 45 having a plurality of images 46 together with an angled edge 41. In further accordance with the present invention, a ticket 44 illustrative of a typical admission ticket or ticket stub of the above described facilities is inserted into the corner pocket formed between ticket flap 40 and rear panel 30. In this manner, and in accordance with the intended utilization of the present invention admission ticket receptacle, the facility operator places ticket 44 into the corner pocket formed by ticket flap 40 in the manner shown in FIG. 2 and thereafter utilizes ticket receptacle 10 as a carrying receptacle for ticket 44 with the combination thereof being provided to the ticket purchaser at the facility. The intended result of providing admission ticket receptacle 10 as a convenient carrying receptacle ticket 44 is the transfer to the patron or customer of the facility of a plurality of advertising or promotional or informational messages and images upon the various panels of the ticket receptacle. It has been found that the convenience associated with retaining ticket 44 or the ticket stub returned to the consumer within ticket receptacle 10 encourages the patron or customer to retain the image baring ticket receptacle. As a result, the tendency of the user to discard the promotional and informational material provided by ticket receptacle 10 is discouraged or overcome due to the attractive and compact character of the ticket receptacle.

In further accordance with the preferred fabrication of the present invention, adhesive 43 is preferably formed of a releasable adhesive which allows flap 40 to be repeated secured to and released from surface 34 of rear panel 30. In this manner, ticket flap 40 may be utilized to either retain ticket receptacle 10 in the closed configuration shown or alternatively to separate ticket flap 40 from rear panel 30 allowing the receptacle to be unfolded and examined on each surface thereof. In this manner the user is able to view the various images upon each of the surfaces of panels 11, 20 and 30 as well as surfaces 45 and 46 of ticket flap 40. For purposes of illustration, FIGS. 3 and 5 show the opened configuration achievable for admission ticket receptacle 10 whereby each surface of each panel as well as each surface of ticker flap 40 may be examined.

Figure 3:
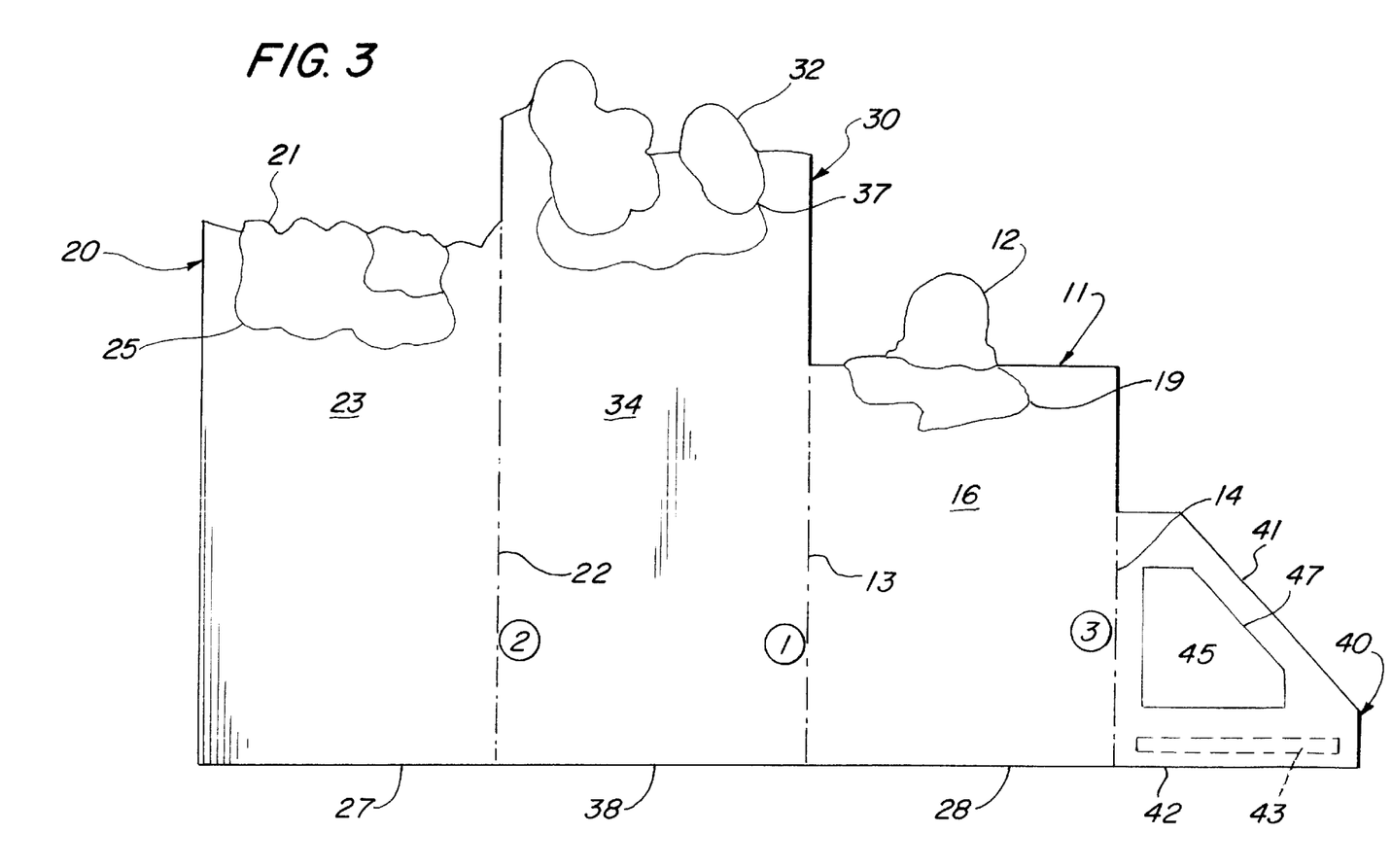
FIG. 3 sets forth the present invention admission ticket receptacle in its unfolded configuration.

FIG. 3 sets forth admission ticket receptacle 10 in the fully opened positioned. As mentioned above, the preferred fabrication of admission ticket receptacle 10 utilizes a single blank of heavy paper or cardboard material or other suitably foldable material which is cut to form the various outer edges of panels 11, 20 and 30 as well as ticket flap 40. Similarly, a fold line is formed between each adjacent panel and between front panel 11 and ticket flap 40 to facilitate the configuration of ticket receptacle 10 in the closed configuration shown in FIGS. 1 and 2. More specifically, ticket receptacle 10 includes a front panel 11 having a bottom edge 28, an upper edge 12 and a surface 16. Surface 16 supports a plurality of images 19. Ticket receptacle 10 further includes a ticket flap 40 having an angled edge 41 and a lower edge 42. Ticket flap 40 further defines a surface 45 and a surface 46 (surface 46 seen in FIG. 4). An adhesive area 43 is formed upon surface 46 and is positioned generally along edge 42. Ticket flap 40 is joined to front panel 11 by a fold line 14.

Ticket receptacle 10 further includes a rear panel 30 having a surface 34 and a surface 33 (surface 33 seen in FIG. 1). Rear panel 30 further includes an upper edge 32 and a lower edge 38. A plurality of images 37 are formed upon surface 34 and as is mentioned above preferably define a correspondence to edge 32. Rear panel 30 is joined to front panel 11 along a fold line 13.

Figure 5:
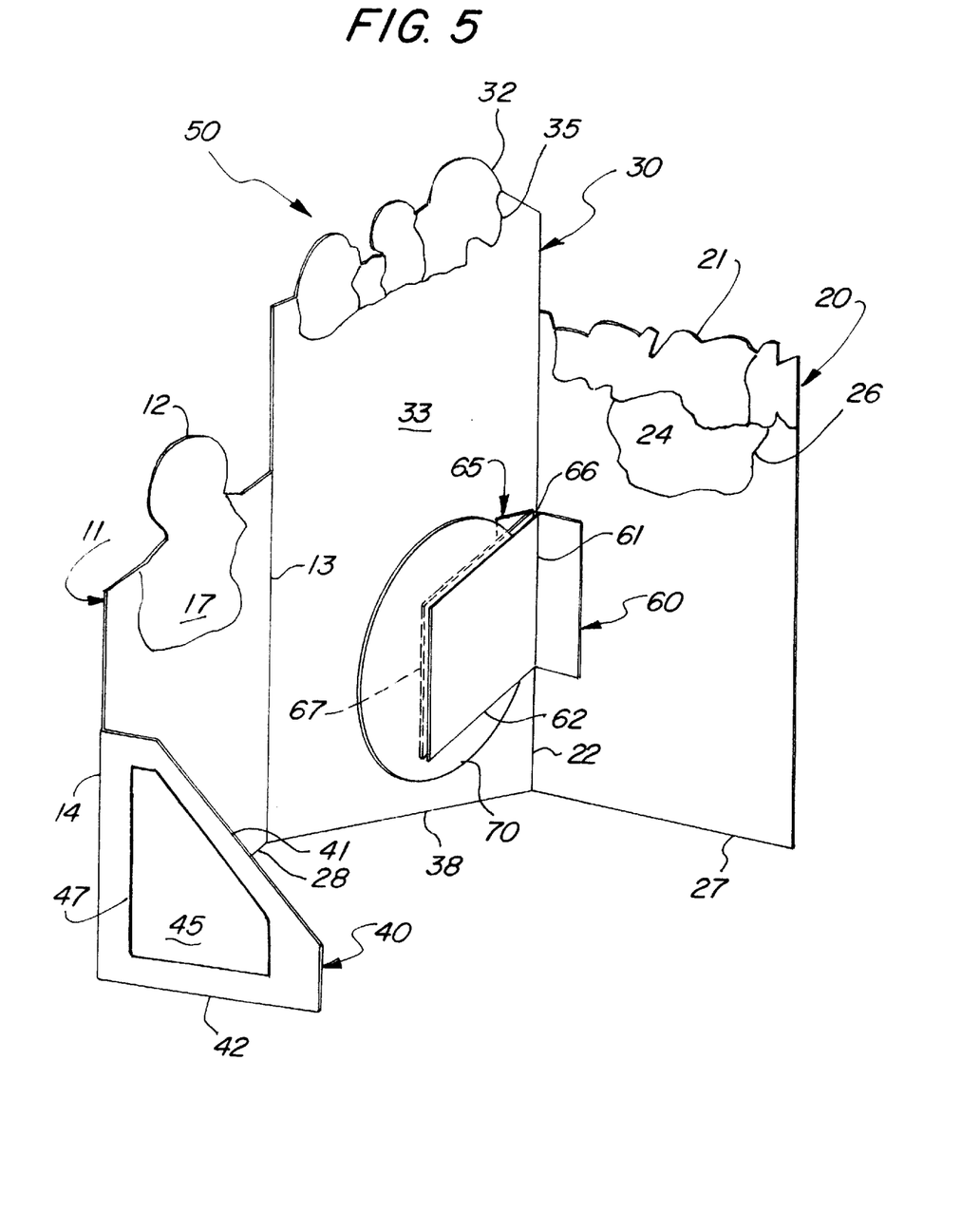
FIG. 5 sets forth a perspective view of an alternate embodiment of the present invention ticket receptacle in a partially unfolded configuration.

Ticket receptacle 10 further includes an interior panel 20 having surfaces 23 and 24 (surface 24 seen in FIG. 5). Interior panel 20 further defines edges 21 and 27 and is joined to panel 30 along a fold line 22. Surface 23 supports a plurality of images 26.

Figure 4:
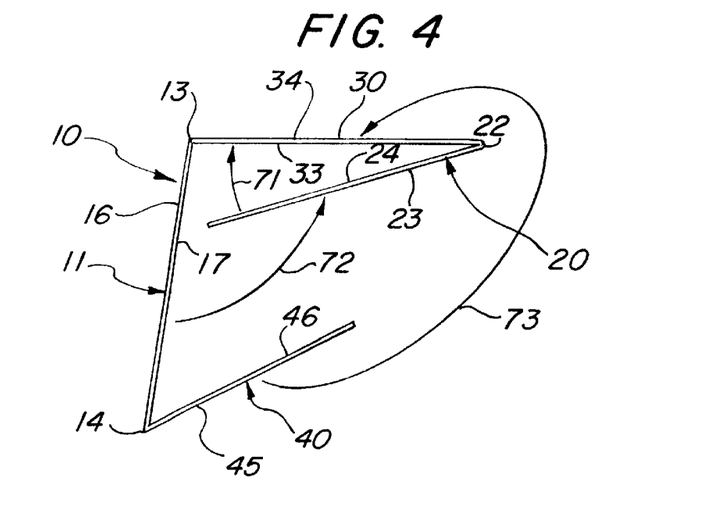
FIG. 4 sets forth a top view of the present invention admission ticket receptacle during the folding and closure process.

FIG. 4 sets forth a top view of admission ticket receptacle 10 illustrating the folding process by which ticket receptacle 10 may be configured in the closed positioned shown in FIGS. 1 and 2. Accordingly, panel 20 is initially folded about fold line 22 in the direction indicated by arrow 71 such that surface 24 of panel 20 overlies surface 33 of panel 30. Thereafter, panel 11 is folded about fold line 13 in the direction indicated by arrow 72 such that surface 17 of panel 11 overlies surface 23 of panel 20. Finally, ticket flap 40 is folded about fold line 14 in the manner indicated by arrow 73 such that fold lines 14 and 22 are generally coincident and such that surface 46 of ticket flap 40 partially overlies surface 34 of panel 30. Once ticket flap 40 is thus positioned the folding of admission ticket receptacle 10 is complete and the attachment of adhesive area 43 (seen in FIG. 2) against surface 34 of panel 30 secures ticket receptacle 10 in the closed configuration shown in FIGS. 1 and 2. At this point, the above described insertion of ticket 44 into the pocket formed by ticket flap 40 shown in FIG. 2 may take place.

In order for the user to be able to view the various images upon panels 11, 20 and 30, the above described closing process of ticket receptacle 10 is reversed to unfold ticket receptacle 10 to the flattened position shown in FIG. 3. This process may be repeated as often as desired using the releasable adhesive attachment of ticket flap 40.

FIG. 5 sets forth a perspective view of an alternate embodiment of the present invention ticket receptacle generally referenced by numeral 50. By way of overview, ticket receptacle 50 is identical to ticket receptacle 10 with the addition of a miniature compact disk 70 and a supporting mechanism therefore.

More specifically, ticket receptacle 50 includes a front panel 11 having an upper edge 12 and a lower edge 28 and defining a surface 17 and a surface 16 (surface 16 shown in FIG. 1). Ticket receptacle 50 further includes a ticket flap 40 having a lower edge 42 and an angled edge 41. Ticket flap 40 defines a surface 45 supporting a plurality of images 47. Ticket flap 40 is joined to front panel 11 by a fold line 14. Ticket receptacle 50 further includes a rear panel 30 having an upper edge 32 and a lower edge 38. Panel 30 defines a surface 33 having images 36 formed thereon and a surface 34 (seen in FIG. 3). Panel 30 is joined to panel 11 along a fold line 13. Ticket receptacle 50 further includes a panel 20 joined to panel 30 along a fold line 22 and having edges 21 and 27 formed therein. Panel 20 defines a surface 24 having a plurality of images 26 formed thereon together with a surface 23 having images 25 formed thereon (surface 23 and images 25 shown in FIG. 3).

As mentioned above, the combination of ticket flap 40 and panels 11, 20 and 30 of ticket receptacle 50 are identical to ticket flap 40 and panels 11, 20 and 30 shown in ticket receptacle 10. In accordance with the further embodiment of the present invention of ticket receptacle 50, the ticket receptacle further includes a pair of tabs 60 and 65 joined to surfaces 24 and 33 of panels 20 and 30 respectively. The attachment of tabs 60 and 65 may be realized using conventional adhesive materials or if desired using a conventional releasable attachment adhesive material. Tab 60 is joined to a flap 62 along a fold line 61 while tab 65 is joined to a flap 67 along a fold line 66. In the preferred fabrication of the present invention, tabs 60 and 65 are positioned with respect to fold line 22 such that fold lines 61 and 66 generally correspond to fold line 22. As a result, the combination of panel 20 and flaps 62 and 67 may be folded in the manner in which panel 20 is folded in the embodiment of FIGS. 1 through 4 to provide the closed configuration of ticket receptacle 50 corresponding to the closed configuration of ticket receptacle 10 shown in FIGS. 1 and 2.

In further accordance with the present invention, flaps 62 and 67 are configured to support a miniature compact disk 70. Compact disk 70 may be fabricated in accordance with conventional fabrication techniques and is useable within conventional compact disk drives of the type typically used for such compact disks. In accordance with the preferred fabrication of the present invention, flaps 62 and 67 utilize a releasable adhesive material for releasably securing compact disk 70 between tabs 62 and 67. Thus in the folded configuration of ticket receptacle 50 formed as panel 20 is folded about fold line 22 upon panel 30, flaps 62 and 67 support compact disk 70 between panels 20 and 30. Thereafter, the closed configuration of ticket receptacle 50 is obtained by folding front panel 11 about fold line 13 to overlie panel 20 and finally by folding ticket flap 40 about fold line 14 to adhesively attach to the rear surface of panel 30. The resulting closed configuration of ticket receptacle 50 functions in the same manner described above for ticket receptacle 10 shown in FIGS. 1 and 2 while adding the further advantage of captivating compact disk 70. The support of compact disk 70 in the manner shown enjoys the additional advantage of avoiding the need to utilize space upon surfaces 24 or 33 to support the compact disk which is better used to support images of the type desired to be presented to the consumer.

Thus ticket receptacle 50 enjoys the various advantages and qualities of ticket receptacle 10 while further adding the support of compact disk 70 to further enhance the promotional advantages and appeal of the ticket receptacle.

Figure 6:
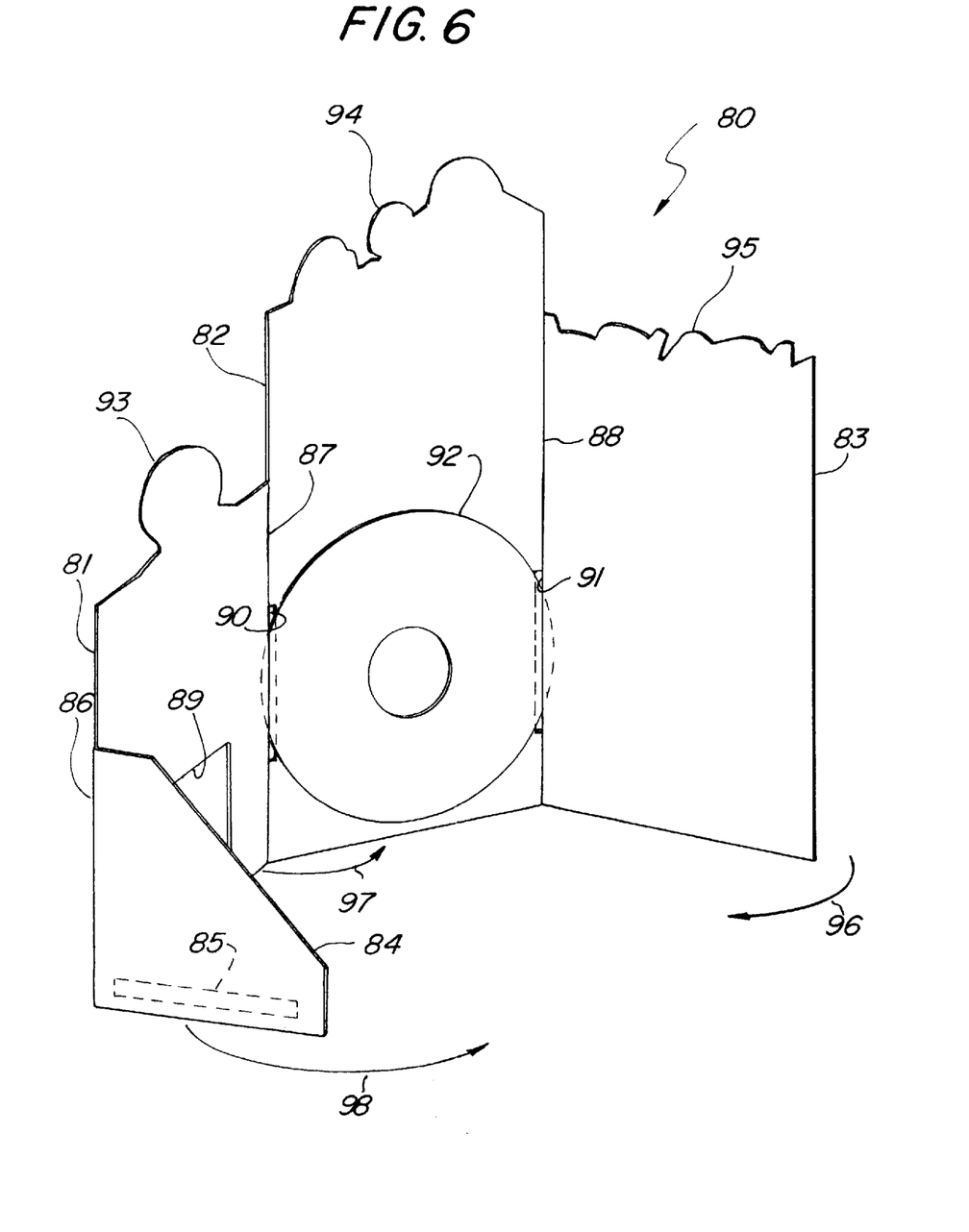
FIG. 6 sets forth a perspective view of a further alternate embodiment of the present invention ticket receptacle in a partially unfolded configuration.

FIG. 6 sets forth a perspective view of an alternate embodiment of the present invention ticket receptacle generally referenced by numeral 80. By way of overview, ticket receptacle 80 is substantially identical to ticket receptacle 50 shown in FIG. 5 with the difference being found in an alternative mechanism for retaining a compact disk (CD 92) and the addition of a viewing window (window 89). In all other respects, ticket receptacle 80 functions in the same manner and folds in the same manner as described above for ticket receptacle 50.

Thus, ticket receptacle 80 includes a plurality of generally planar panels 81, 82 and 83 having respective top edges 93, 94 and 95. Receptacle 80 further includes a ticket flap 84 joined to panel 81 at a fold line 86 and having an adhesive area 85 formed thereon. Panel 81 defines a viewing window 89 and is joined to panel 82 at a fold line 87. A fold line 88 joins panel 83 and 82. A pair of elongated slots 90 and 91 are formed along fold lines 87 and 88 and are used to receive edge portions of a compact disk (CD) 92. Ticket receptacle 80 is folded by initially folding panel 83 about fold line 88 in the direction of arrow 96 and thereafter folding panel 81 about fold line 87 in the direction 97 to overlie panel 83. Finally, ticket flap 84 is folded about fold line 86 to overlie the rear surface of panel 82 and is secured thereto by an adhesive 85. In this folded configuration (seen in FIG. 7), window 89 allows viewing of an underlying portion of CD 92 and ticket flap 84 receives and retains an admission ticket against the rear surface of panel 82.

Figure 7:
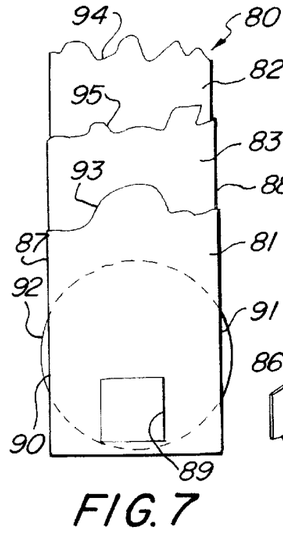
FIG. 7 sets forth the ticket receptacle of FIG. 6 in a folded configuration.

FIG. 7 sets forth ticket receptacle 80 in a folded configuration. In this folded configuration, ticket receptacle 80 includes panels 81, 82 and 83 having progressively raised edges 93, 95 and 94 for display. Ticket flap 84 (seen in FIG. 6) is folded about the rear side of panel 82 and secures the ticket receptacle in its folded configuration. Slots 90 and 91 receive the edges of CD 92 along fold lines 87 and 88 to retain CD 92. Window 89 formed in panel 81 facilitates viewing the underlying portion of CD 92. Thus, ticket receptacle 80 provides an attractive package which retains the consumers ticket for convenience and provides decorative information and advertising together with a compact disk in a simple folded package.

Figure 8:
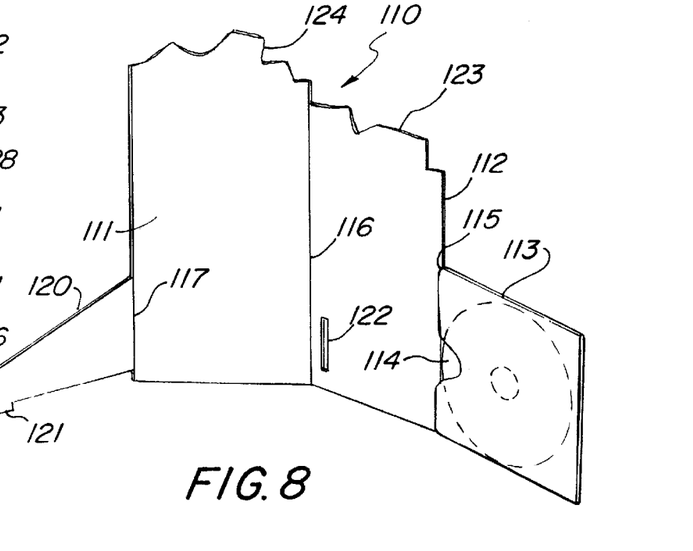
FIG. 8 sets forth a perspective view of a still further alternate embodiment of the present invention ticket receptacle in an unfolded configuration.

FIG. 8 sets forth a perspective view of a still further alternate embodiment of the present invention ticket receptacle generally referenced by numeral 110. Ticket receptacle 110 is generally similar to the above described ticket receptacles in that it is formed of a plurality of panels together with a compact disk retaining mechanism. Ticket receptacle 110 further introduces a convenient display configuration capability which in addition to the folded configuration (seen in FIG. 9) provides a display stand-like configuration (seen in FIG. 10).

Figure 9:
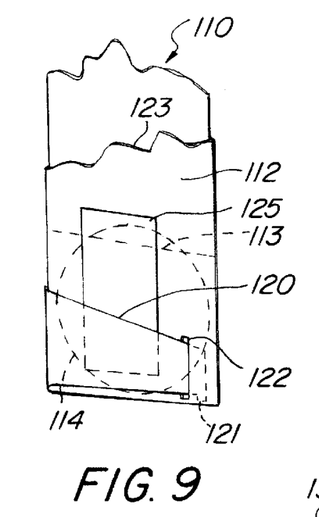
FIG. 9 sets forth the ticket receptacle of FIG. 8 in a folded configuration.
Figure 10:
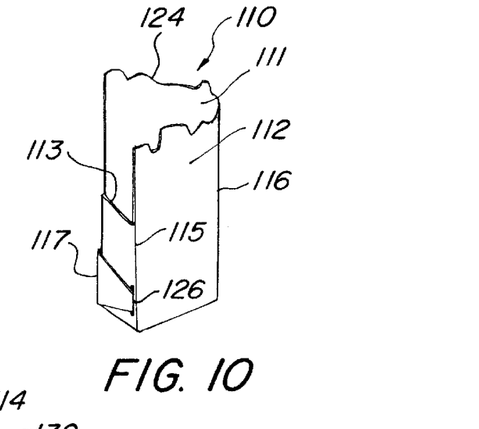
FIG. 10 sets forth the ticket receptacle of FIGS. 8 and 9 in a display configuration.
Figure 11:
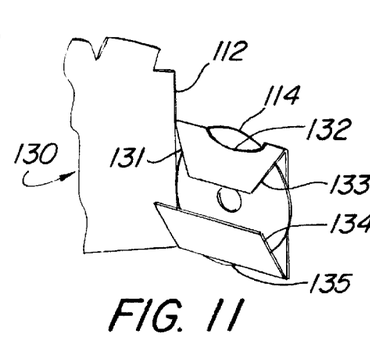
FIG. 11 sets forth a partial perspective view of an alternate embodiment of the present invention ticket receptacle which differs from the ticket receptacle of FIG. 8 by providing an alternative CD holding mechanism.

Thus, with simultaneous reference to FIGS. 8, 9 and 10, ticket receptacle 110 includes a pair of panels 111 and 112 joined along a fold line 116. Receptacle 110 further includes a ticket flap 120 joined to panel 111 at a fold line 117 and having a tab 121 formed thereon. A CD pocket 113 receives a CD 114 and is joined to panel 112 at a fold line 115. Upper edges 123 and 124 are formed on panels 112 and 111 respectively. Finally, a slot 122 is formed within panel 112 which in the folded configuration of FIG. 9 receives tab 121 to maintain closure of the ticket receptacle. In addition and as is best seen in FIG. 10, CD pocket 113 further defines a slot 126 which receives tab 121 to secure ticket receptacle 110 in the display configuration of FIG. 10.

Thus, ticket receptacle 110 may be open to the configuration shown in FIG. 8 and a CD 114 inserted into pocket 113. Thereafter, ticket receptacle 110 may be folded to the configuration shown in FIG. 9 and secured by the insertion of tab 121 within slot 122. In this configuration, an admission ticket 125 is retained between flap 120 and the front surface of panel 112. In addition, ticket receptacle 110 may be configured in the display configuration of FIG. 10 by positioning CD pocket 113 and panels 111 and 112 in a triangular prism arrangement and securing tab 121 within slot 126. It has been found that this additional display capability provided by the present invention embodiment shown in FIGS. 8, 9 and 10 further enhance the aesthetic appeal and market ability of the present invention ticket receptacle.

Figures 12, 13, 14, 15, 16, 17:
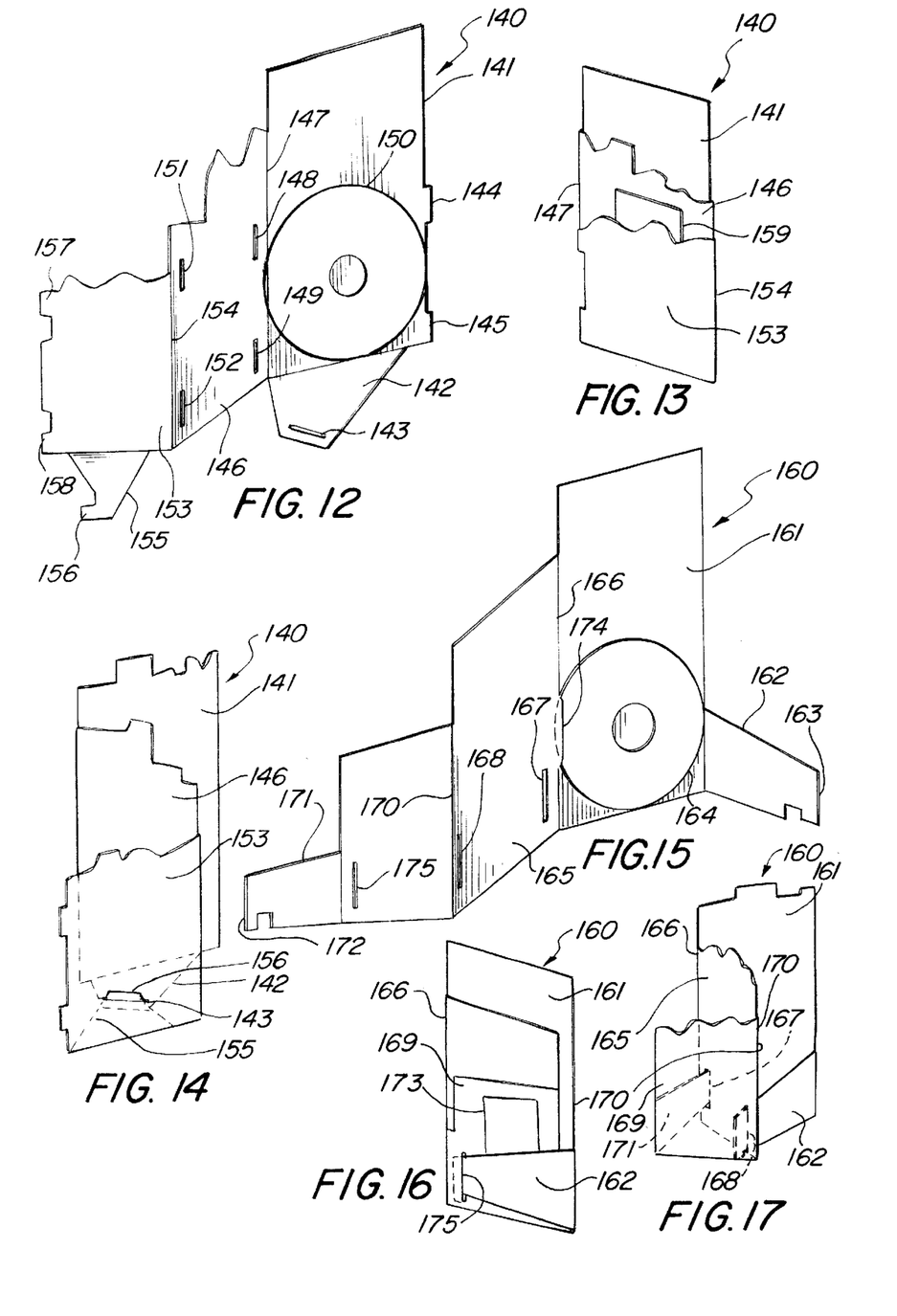
FIG. 12 sets forth a perspective view of a still further alternate embodiment of the present invention ticket receptacle in a partially unfolded configuration.
FIG. 13 sets forth the ticket receptacle of FIG. 12 in a folded configuration.
FIG. 14 sets forth a perspective view of the ticket receptacle of FIG. 12 in a display configuration.
FIG. 15 sets forth a perspective view of a still further alternate embodiment of the present invention ticket receptacle in an unfolded configuration.
FIG. 16 sets forth the ticket receptacle of FIG. 15 in a folded configuration.
FIG. 17 sets forth a perspective view of the ticket receptacle of FIGS. 15 and 16 in a display configuration.

FIGS. 12, 13 and 14 set forth a still further alternate embodiment of the present invention ticket receptacle which also includes a mechanism for retaining a conventional compact disk (CD 150). FIG. 12 shows ticket receptacle 140 in its open or unfolded position while FIG. 13 shows receptacle 140 in its closed position as the receptacle would be utilized in retaining a ticket 159. FIG. 14 shows ticket receptacle 140 in its display configuration.

Thus, with simultaneous reference to FIGS. 12, 13 and 14, ticket receptacle 140 includes a plurality of panels 141, 146 and 153 mutually joined by fold lines 147 and 154. Panel 141 defines a pair of tabs 144 and 145 while panel 146 defines a plurality of slots 148, 149, 151 and 152. A flap 142 is joined to the lower edge of panel 141 and defines a slot 143 while a flap 155 is joined to the lower edge of panel 153 and defines a tab 156. A CD 150 is received upon panel 141 and extends between tabs 144 and 145.

Once CD 150 has been placed upon panel 141, receptacle 140 is folded to the closed configuration of FIG. 13 by folding flap 142 upwardly upon CD 150 and thereafter folding panel 146 about fold line 147 to overlie CD 150 and flap 142. The fold of panel of 146 is maintained by the insertion of tabs 144 and 145 into slots 151 and 152 respectively. Finally, flap 155 is folded upwardly between flaps 153 and 146 and panel 153 is folded to overlie panel 146 and maintained by the insertion of tabs 157 and 158 into slots 148 and 149. At this point, a ticket 159 is retained between panels 153 and 146.

Ticket receptacle 140 is reconfigurable to the display configuration of FIG. 14 by simply positioning panels 141, 146 and 153 in a "Z" arrangement and interlocking tab 156 within slot 143 of flap 142 as shown in FIG. 14.

FIGS. 15, 16 and 17 set forth a further alternate embodiment of the present invention ticket receptacle in its unfolded, folded and display configurations respectively. In accordance with the present invention, ticket receptacle 160 receives and supports a CD 164 and a ticket 173.

Thus, with simultaneous reference to FIGS. 15, 16 and 17, ticket receptacle 160 includes a plurality of panels 161, 165 and 169 joined by fold lines 166 and 170. Panel 165 defines a pair of slots 167 and 168 while panel 161 supports a flap 162 having a tab 163 formed thereon. Panel 161 further defines a slot 174 which receives the edge portion of a CD 164. Panel 169 further supports a flap 171 having a tab 172 formed therein. Once CD 164 is positioned upon panel 161, ticket receptacle 160 is folded to the configuration shown in FIG. 16 by pivoting panel 165 about fold line 166 and thereafter pivoting panel 169 about fold line 170. Flap 171 is folded inwardly to be captivated between panels 165 and 169 after which flap 162 is folded across the frontal surface of panel 169 and is received within a slot 175 formed in panel 169. An admission ticket 173 is retained between flap 162 and panel 169 while CD 164 is captivated between panels 161 and 165.

Ticket receptacle 160 is configured in the display arrangement shown in FIG. 17 by partially folding panels 161, 165 and 169 in a Z fold and inserting tabs 163 and 172 into apertures 168 and 167 of panel 165 respectively.

Figure 18:
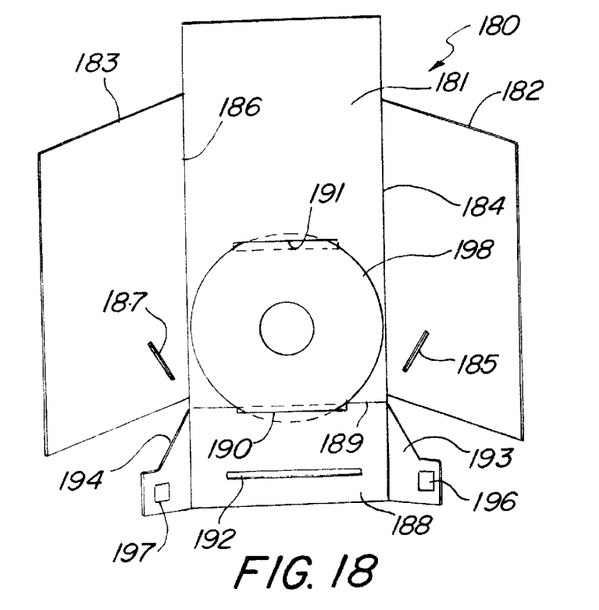
FIG. 18 sets forth a still further alternate embodiment of the present invention ticket receptacle in an unfolded configuration.
Figure 19:
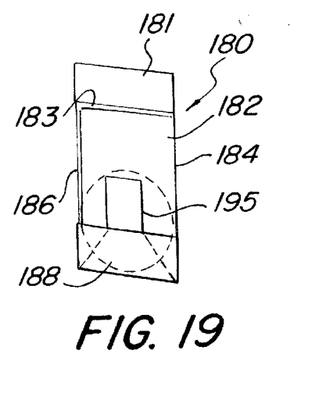
FIG. 19 sets forth the ticket receptacle of FIG. 18 in a folded configuration.

FIGS. 18 and 19 set forth a still further alternate embodiment of the present invention ticket receptacle generally referenced by numeral 180. With simultaneous reference to FIGS. 18 and 19, ticket receptacle 180 includes a plurality of panels 181, 182 and 183 joined along fold lines 184 and 186. A panel 188 is joined to the lower edge of panel 181 by a fold line 189. Panel 188 further defines a pair of slots 190 and 192 together with a pair of flaps 193 and 194 having respective adhesive areas 196 and 197. A slot 191 is formed in panel 181 and cooperates with slot 190 to receive and support a CD 198. A pair or angled slots 185 and 187 are formed in panels 182 and 183 respectively. Thus, in the opened configuration of FIG. 18 a CD 198 is retained by partial insertion within slots 190 and 191. Thereafter, panels 182 and 183 are folded inwardly about fold lines 184 and 186 and panel 188 is folded upwardly to overlie panels 182 and 183. Finally, flaps 193 and 194 are folded about the edges of panels 182 and 183 and secured to the rear surface of panel 181 by adhesive areas 196 and 197. In this manner, ticket receptacle 180 is folded to the closed configuration shown in FIG. 19. This is the configuration in which the consumer is presented with ticket receptacle 180 and an admission ticket 195 is retained between panel 188 and panel 182 as shown in FIG. 19.

In further accordance with an important advantage of ticket receptacle 180, panels 182 and 183 may be folded partially forward about fold lines 184 and 186 allowing panel 188 to be pivoted upwardly and further allowing CD 198 to be captivated within slots 191 and 192 in an angled presentation. Panel 188 is secured by inserting the outer portions of flaps 193 and 194 into slots 185 and 187 respectively.

Figures 20, 21:
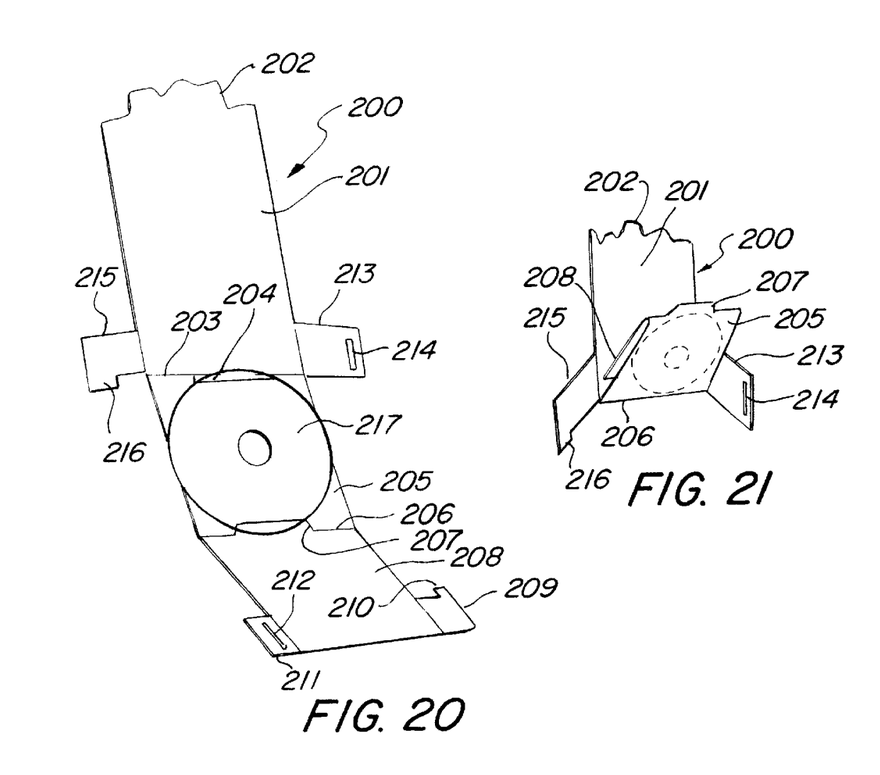
FIG. 20 sets forth a still further alternate embodiment of the present invention ticket receptacle in an unfolded configuration.
FIG. 21 sets forth a perspective view of the ticket receptacle of FIG. 20 during the folding process.

FIGS. 19 and 20 set forth perspective views of a still further alternate embodiment of the present invention ticket receptacle. Generally referenced by numeral 200. Ticket receptacle 200 differs from the foregoing ticket receptacles in the vertical orientation of its panels and fold lines. Thus, ticket receptacle 200 includes a trio of panels 201, 205 and 208 joined by fold lines 203 and 206. Panel 201 defines an upper edge 202 and a pair of flaps 213 and 215. Flap 213 defines a slot 214 while flap 215 defines a tab 216. A slot 204 is formed along fold line 203 and receives a portion of a CD 217. A cutout 207 is defined along fold line 206 and receives the opposite edge portion of CD 217. Panel 208 further includes a pair of flaps 209 and 211. Flap 209 defines a tab 210 while flap 211 defines a slot 212.

In the open configuration of FIG. 20, CD 217 is positioned within slot 204 and cutout 207 after which panel 208 is folded upon CD 217 and the combination of panels 208 and 205 is folded upon panel 201 along fold line 203. Flaps 209 and 211 are folded inwardly and are retained between panels 205 and 208 while flaps 213 and 215 are folded inwardly upon flap 205 allowing tab 216 to be locked within slot 214 and completing the closure. An admission ticket is receivable between panels 208 and 201 in the closed configuration.

Figure 22:
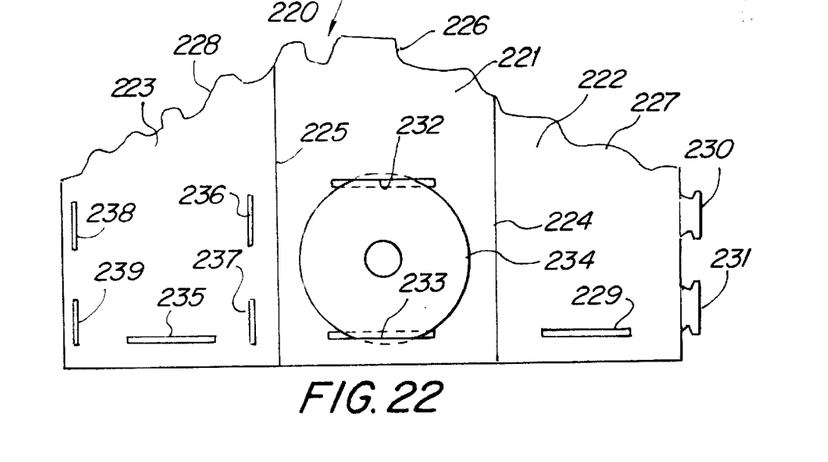
FIG. 22 sets forth a still further alternate embodiment of the present invention ticket receptacle in an unfolded configuration.
Figures 23, 24, 25:
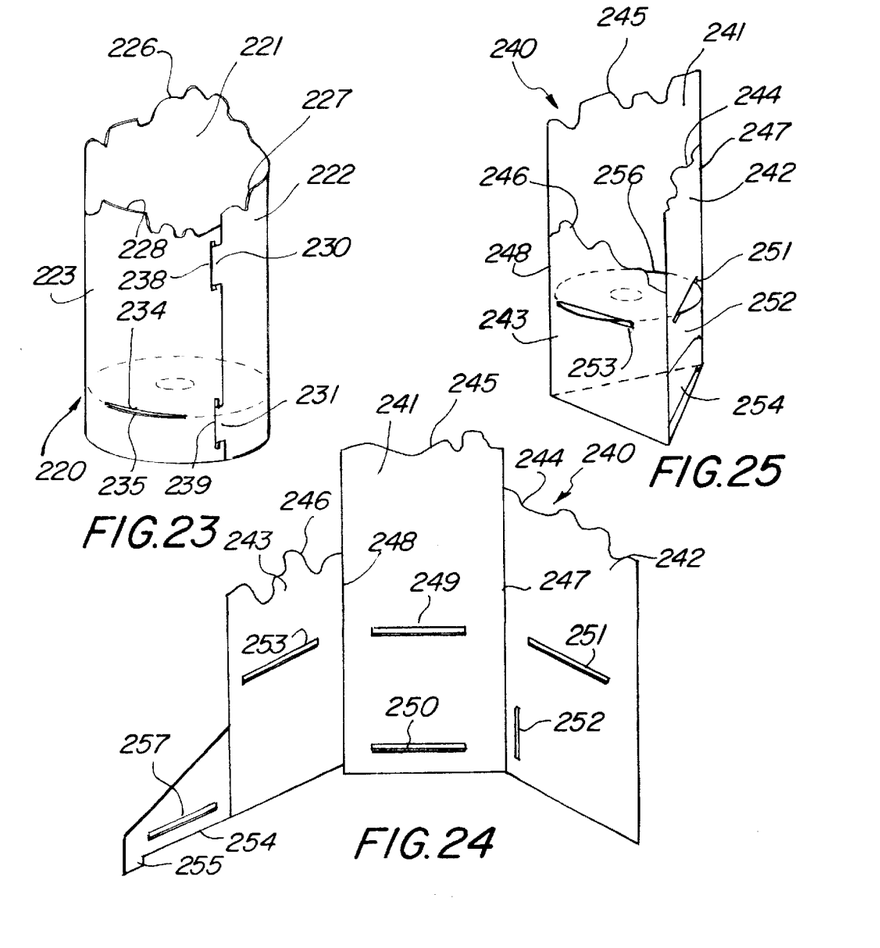
FIG. 23 sets forth a perspective view of the ticket receptacle of FIG. 22 in a display configuration.
FIG. 24 sets forth a perspective view of a still further alternate embodiment of the present invention ticket receptacle in a partially unfolded configuration.
FIG. 25 sets forth a perspective view of the ticket receptacle of FIG. 24 in a display configuration.

FIGS. 22 and 23 set forth a still further alternate embodiment of the present invention ticket receptacle generally referenced by numeral 220. FIG. 22 shows ticket receptacle 220 in the open configuration while FIG. 23 shows ticket receptacle 220 in its display configuration. Thus, with simultaneous reference to FIGS. 22 and 23, ticket receptacle 220 includes a plurality of panels 221, 222 and 223 joined along fold lines 224 and 225. Panel 221 defines a pair of slots 232 and 233 which receive and maintain a CD 234. Panels 221, 222 and 223 define respective upper edges 226, 227 and 228 which preferably form a single continues images upper edge. Panel 222 supports a pair of tabs 230 and 231 and defines a slot 229. Panel 223 defines a plurality of slots 236, 237, 238 and 239 together with a lower slot 235. Slots 229, 233 and 235 are preferably arranged along a common line.

In the open configuration of FIG. 22 CD 234 is received partially within slots 232 and 233 and is thereby retained upon panel 221. Thereafter, panel 223 is folded inwardly about fold line 225 to overlie panel 221 after which panel 222 is folded about fold line 224 to overlie panel 223. The closure of panel 222 is maintained by the insertion of tabs 230 and 231 into slots 236 and 237 respectively. An admission ticket (not shown) is inserted between panels 222 and 223 to complete the admission ticket receptacle assembly. In the display configuration of FIG. 3, panels 221, 222 and 223 are formed cylindrically about CD 234 such that the outer edge of CD 234 is partially received within slots 229, 233 and 235. The cylindrical shape of the display configuration is maintained by the insertion of tabs 230 and 231 into slots 238 and 239. Thus, a convenient cup receptacle-like shape is imparted to ticket receptacle 220.

FIGS. 24 and 25 set forth a still further alternate embodiment of the present invention ticket receptacle generally referenced by numeral 240. Ticket receptacle 240 is shown in its open configuration in FIG. 24 and in its display configuration in FIG. 25.

Thus, with simultaneous reference to FIGS. 24 and 25, ticket receptacle 240 includes a plurality of panels 241, 242 and 243 having respective upper edges 245, 244 and 246. Panels 242 and 243 are joined to panel 241 along fold lines 247 and 248 respectively. Panel 241 defines a pair of slots 249 and 250 which receive CD 256. Panel 242 defines a slot 251 aligned with slot 249 and a slot 252. Panel 243 defines a slot 253 aligned with slots 249 and 251. A flap 254 is joined to panel 243 and defines an adhesive area 257 and a tab 255.

In the open configuration of FIG. 4, CD 256 is secured upon panel 241 by inserting edge portions thereof into slots 249 and 250. Thereafter, panel 242 is folded about fold line 247 upon panel 241 and panel 243 is like wise folded upon panel 242. Flap 254 is wrapped about the rear surface of panel 241 and secured thereto by adhesive area 257. An admission ticket is conveniently receivable between panels 243 and 242 in this closed configuration.

In the display configuration shown in FIG. 25, ticket receptacle 240 is formed into a triangular arrangement in which CD 256 is captivated by edge insertion into slots 249, 251 and 253. The display configuration is retained by the insertion of tab 255 into slot 252 as shown.

Figures 26, 27, 33, 34, 35:
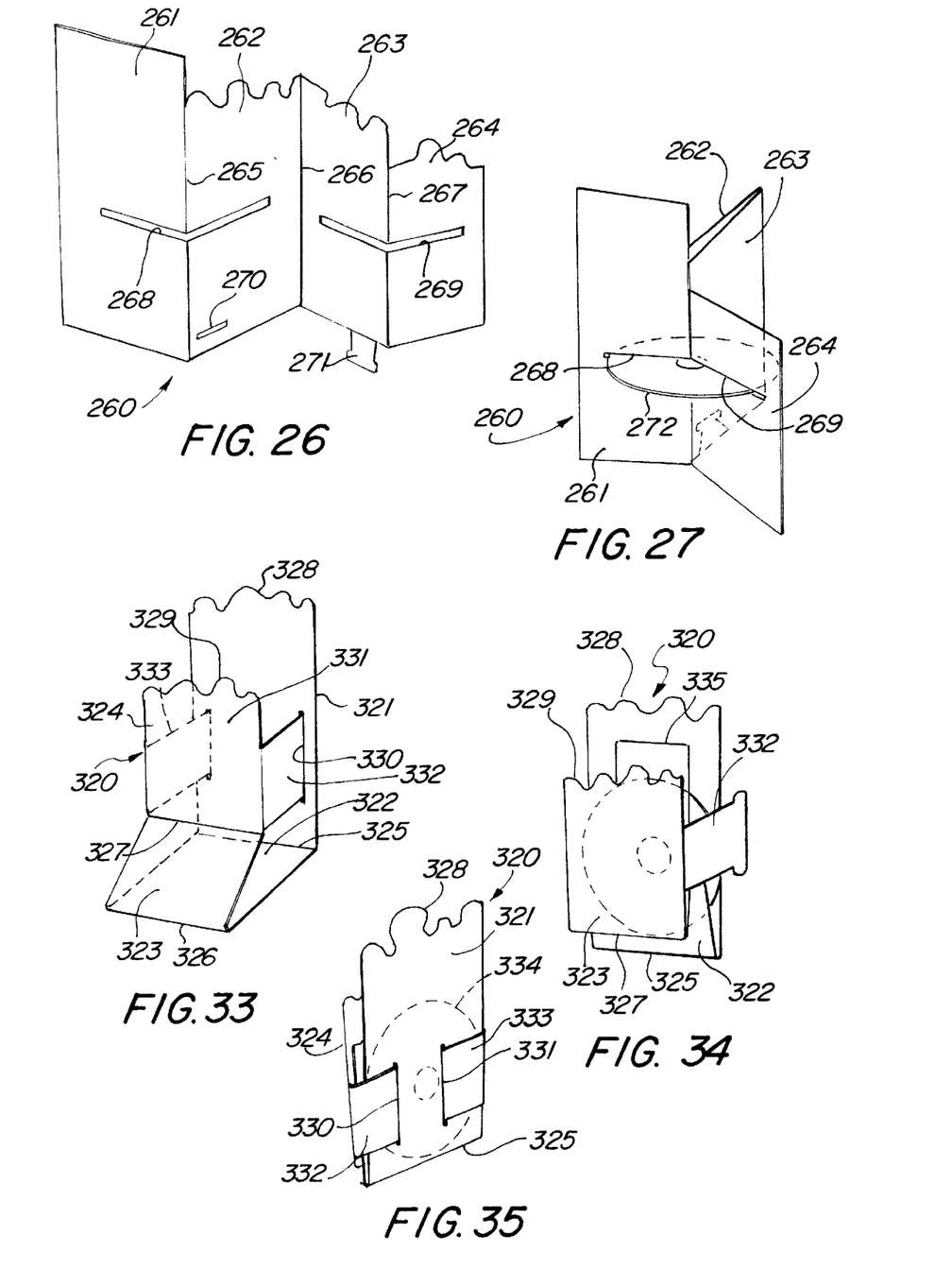
FIG. 26 sets forth a perspective view of a still further alternate embodiment of the present invention ticket receptacle in a partially unfolded configuration.
FIG. 27 sets forth a perspective view of the ticket receptacle of FIG. 26 in a display configuration.
FIG. 33 sets forth a perspective view of a still further alternate embodiment of the present invention ticket receptacle in its display configuration.
FIG. 34 sets forth a perspective view of the ticket receptacle of FIG. 33 in a partially folded configuration.
FIG. 35 sets forth a rear perspective view of the ticket receptacle of FIGS. 33 and 34 in its folded configuration.

FIGS. 26 and 27 set forth a still further alternate embodiment of the present invention ticket receptacle generally referenced by numeral 260. Ticket receptacle 260 is shown in a partially unfolded configuration in FIG. 26 and is shown in a display in FIG. 27.

Thus, in simultaneous reference to FIGS. 26 and 27, ticket receptacle 260 includes a plurality of panels 261, 262, 263 and 264 joined by respective fold lines 265, 266 and 267. Panels 261 and 262 define an elongated slot 268 extending therebetween. Similarly, panels 263 and 264 define an elongated slot 269 extending therebetween. Panel 262 a slot 270 while panel 263 defines a downwardly extending tab 271.

Ticket receptacle 260 is formed into its closed position by folding panel 262 upon panel 261 and thereafter folding panel 263 upon 262 and panel 264 upon 263 in an accordion pleat arraignment. An admission ticket (not shown) may be inserted between panels 263 and 264 when ticket receptacle 260 is in its closed or folded configuration. Ticket receptacle 260 forms its display configuration in the manner shown in FIG. 27 as panels 262 and 263 are folded together and as panels 261 and 264 are spaced in approximately equal angles from the combination of panels 262 and 263. Tab 271 may be folded upwardly upon panel 262 and inserted into slot 270 formed therein to maintain the generally Y-shaped configuration shown in FIG. 27. With panels 261 through 264 thus configured compact disk 272 is received within slots 268 and 269 to complete the display configuration.

Figures 28, 29, 30, 32:
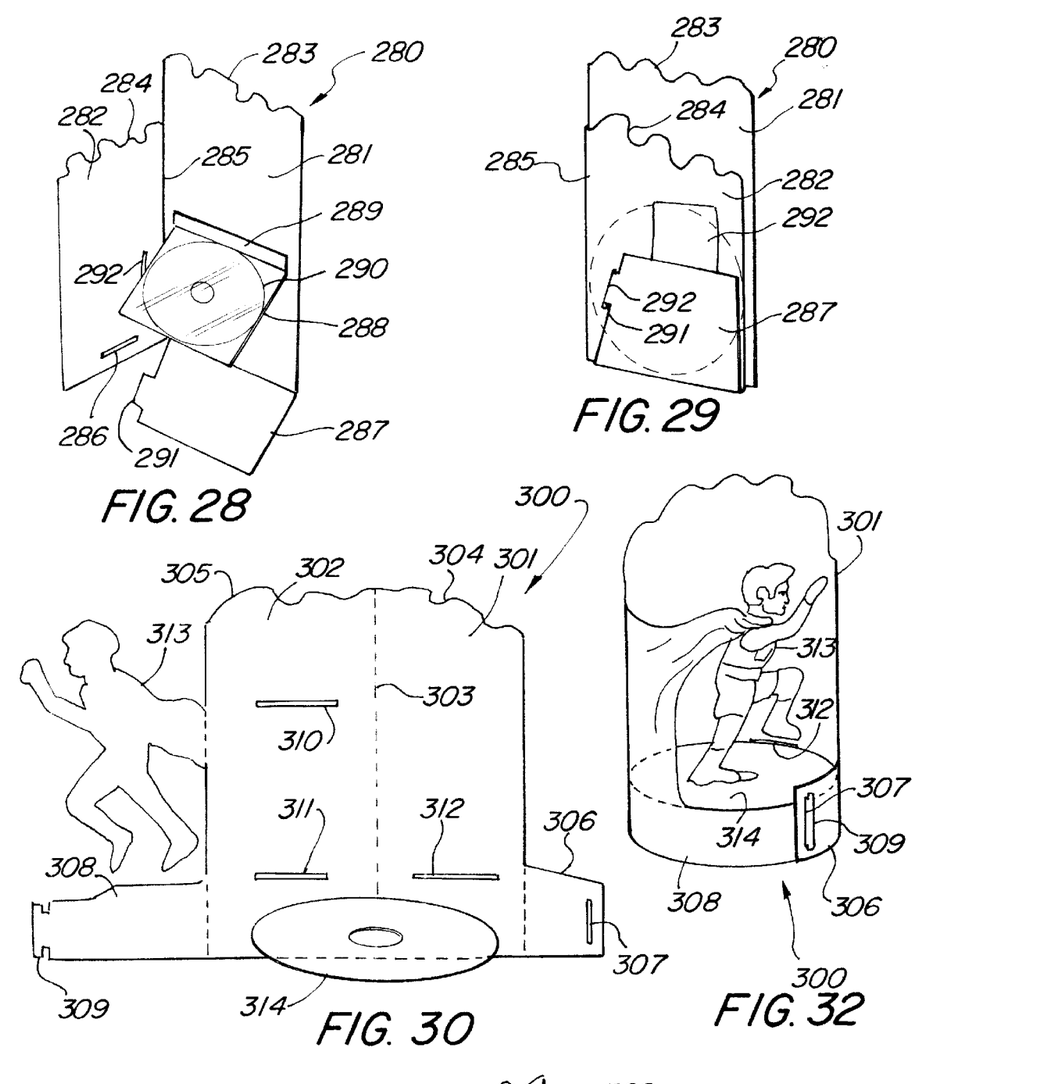
FIG. 28 sets forth a perspective view of a still further alternate embodiment of the present invention ticket receptacle in a partially unfolded configuration.
FIG. 29 sets forth the ticket receptacle of FIG. 28 in a folded configuration.
FIG. 30 sets forth a still further alternate embodiment of the present invention ticket receptacle in an unfolded configuration.
FIG. 32 sets forth a perspective view of the receptacle of FIG. 30 in a display configuration.

FIGS. 28 and 29 set forth a still further alternate embodiment of the present invention ticket receptacle generally referenced by numeral 280. Ticket receptacle 280 is shown in its open configuration in FIG. 28 and in its closed configuration in FIG. 29.

With simultaneous reference to FIGS. 28 and 29, ticket receptacle 280 includes a pair of panels 281 and 282 joined along a fold line 285. Panel 281 defines an upper edge 283 and further supports a flap 287 along its lower edge. Flap 287 defines a tab 291. A clear CD envelope 288 is secured to panel 281 by an adhesive area 289. A CD 290 is supported within envelope 288. Panel 282 defines an upper edge 284 and a pair of slots 286 and 292 therein. Ticket receptacle 280 is configured into the closed configuration of FIG. 29 by positioning CD 290 within envelope 288 and thereafter folding panel 282 upon panel 281 about fold line 285. Thereafter, flap 287 is folded upwardly upon the frontal surface of panel 282 such that tab 291 is inserted into slot 292 to complete closure. In the closed configuration of ticket receptacle 280, an admission ticket 292 is inserted between flap 287 and panel 282 as shown in FIG. 29.

Ticket receptacle 280 is also configured into a display configuration by initially positioning panels 281 and 282 in an angled relationship as shown in FIG. 28 and thereafter aligning tab 291 with slot 286 and then pivoting panel 282 to insert tab 291 into slot 286.

Figure 31:
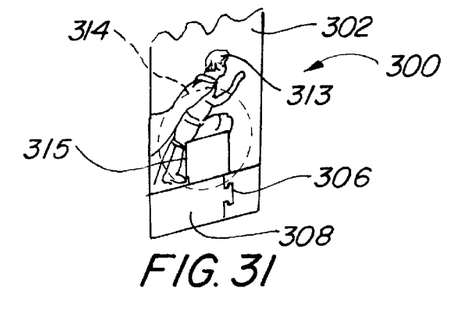
FIG. 31 sets forth a perspective view of the ticket receptacle of FIG. 30 in a folded configuration.

FIGS. 30, 31 and 32 set forth a still further alternate embodiment of the present invention ticket receptacle generally referenced by numeral 300. Ticket receptacle 300 is shown in its open configuration in FIG. 30 and in its closed configuration in FIG. 31. In FIG. 32 ticket receptacle 300 is shown in its display configuration.

With simultaneous reference to FIGS. 30, 31 and 32, ticket receptacle 300 includes a pair of panels 301 and 302 joined by a fold line 303. Panel 301 defines a slot 312 and a tab 306 having a slot 307. Panel 302 defines a pair of slots 310 and 311 and an extending flap 308 having a tab 309 formed therein. Panel 302 further supports a figure 313 joined thereto. Panels 301 and 302 further define respective upper edges 304 and 305.

Ticket receptacle 300 is configured in its closed configuration by placing CD 314 within slots 310 and 311 upon panel 302 and thereafter folding panel 301 about fold line 303 to overlie panel 302. Thereafter, figure 313 and flap 308 are folded upon panel 301 and tab 306 is folded to meet flap 308 and receive tab 309. Thus, in the closed configuration shown in FIG. 31 a ticket 315 is receivable beneath flap 308 against panel 301.

Ticket receptacle 300 is further configured in a display configuration shown in FIG. 32 as panels 301 and 302 are formed into a generally cylindrical enclosure and as CD 314 is received within slots 311 and 312. The cylindrical enclosure of panels 301 and 302 is maintained by the interlock of tab 309 within slot 307.

FIGS. 33, 34 and 35 set forth a still further alternate embodiment of the present invention ticket receptacle generally referenced by numeral 320. Ticket receptacle 320 is shown in a display configuration in FIG. 33 and in a closed configuration in FIG. 35. FIG. 34 shows ticket receptacle 320 during the configuration thereof into the folded configuration of FIG. 35.

Thus, with simultaneous reference to FIGS. 33, 34 and 35, ticket receptacle 320 includes a plurality of panels 321, 322, 333 and 324 joined by respective fold lines 325, 326 and 327. Panel 321 defines an upper edge 328 and a pair of slots 330 and 331. Panel 324 supports a pair of flaps 332 and 333. In the display configuration shown in FIG. 33, ticket receptacle 320 is folded to define a general right angle between panels 321 and 322 and a rearward and upward angle of panel 323. Panel 324 is positioned generally vertically and is maintained by the insertion of flaps 332 and 333 within slots 330 and 331.

Ticket receptacle 320 is formed into its closed configuration by initially folding panel 322 about fold line 325 upwardly about panel 321 after which panel 323 is folded downwardly upon panel 322 and panel 324 is folded upwardly about fold line 327 to the approximate configuration shown in FIG. 34. Thereafter, flaps 332 and 333 are folded about the rear surface of panel 321 and are inserted into slots 330 and 331 respectively to configure ticket receptacle 320 into the closed configuration shown in FIG. 35. A CD 334 is captivated between panels 322 and 321. Further, a ticket 335 is receivable between panels 324 and 323.

What has been shown is a simple low-cost admission ticket receptacle which may be utilized to provide a convenient carrying packet for the customer or patron of an entertainment facility or the like which in turn conveniently supports a plurality of images for communication to the customer or patron. The ticket receptacle is easily fabricated of a simple heavy paper or cardboard blank using a conventional printing and cutting operation followed by conventional folding assembly.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A ticket receptacle constructed to receive an admission ticket, said ticket receptacle comprising:
   a plurality of generally planar panels joined by a plurality of fold lines, each of said panels defining an upper edge and each of said upper edges being spaced from each of said remaining upper edges;
   a plurality of images formed on said panels; and
   closure means extending from one of said panels,
   said plurality of panels defining a closed configuration by being folded about said fold lines to overlie each other and to form a ticket-retaining pocket for receiving an admission ticket and said closure means being attachable to one of said panels to maintain said panels in said closed configuration wherein at least two of said upper edges are visible in said closed configuration.

2. A ticket receptacle constructed to receive an admission ticket, said ticket receptacle comprising:
   a plurality of generally planar panels joined by a plurality of fold lines, each of said panels defining an upper edge and at least two of said panel upper edges being spaced from all remaining ones of said upper edges;
   a pocket secured to one of said panels having a pocket enclosed enclosure for receiving a compact disk;
   a plurality of images formed on said panels; and
   closure means extending from one side of said panels,
   said plurality of panels defining a closed configuration by being folded about said fold lines to overlie each other and enclose said pocket and to form a ticket-retaining pocket for receiving an admission ticket and said closure means being attachable to one of said panels to maintain said panels in said closed configuration and whereby said at least two upper edges are visible.

3. The ticket receptacle set forth in claim 2 wherein said upper edges of each said panels forms a portion of one of said images.

4. A ticket receptacle constructed to receive an admission ticket, said ticket receptacle comprising:
   a plurality of generally planar panels joined by a plurality of fold lines, each of said panels defining an upper edge each of said upper edges spaced from the remaining ones of said upper edges;
   a pocket secured to one of said panels having a pocket enclosure for receiving a compact disk; and
   a plurality of images formed on said panels, said plurality of panels defining a closed configuration by being folded about said fold lines to overlie each other and enclose said pocket and receive an admission ticket.

5. A ticket receptacle constructed to receive an admission ticket, said ticket receptacle comprising:
   a plurality of generally planar panels joined by a plurality of fold lines, each of said panels defining an upper edge;
   a plurality of images formed on said panels, each of said upper edges forming a portion of one of said images; and
   closure means extending from one of said panels,
   said plurality of panels defining a closed configuration by being folded about said fold lines to overlie each other and to form a ticket-retaining pocket for receiving an admission ticket and said closure means being attachable to one of said panels to maintain said panels in said closed configuration.

6. The ticket receptacle set forth in claim 5 wherein said plurality of panels includes opposed end panels.

7. The ticket receptacle set forth in claim 6 wherein said closure means includes a flap joined to one of said end panels and an adhesive area formed on said flap.

8. The ticket receptacle set forth in claim 7 wherein said flap forms one side of said ticket-retaining pocket.

9. The ticket receptacle set forth in claim 8 further including CD means for retaining a compact disk against one of said panels.

10. The ticket receptacle set forth in claim 9 wherein said CD means include a pair of slots formed in said one of said panels.

11. The ticket receptacle set forth in claim 9 wherein said CD means include a pocket for receiving a compact disk secured to said one of said panels.

12. The ticket receptacle set forth in claim 6 wherein said plurality of panels is alternatively configurable into a display configuration.

13. The ticket receptacle set forth in claim 9 wherein said panels define a prism in said display configuration.

* * * * *